United States Patent [19]

Kurtz et al.

[11] 4,051,451
[45] Sept. 27, 1977

[54] BEAM TYPE TRANSDUCERS EMPLOYING DUAL DIRECTION FORCE LIMITING MEANS

[75] Inventors: Anthony D. Kurtz, Englewood; Joseph R. Mallon, Alpine; Amnon Brosh, Demarest, all of N.J.

[73] Assignee: Kulite Semiconductor Products, Inc., Ridgefield, N.J.

[21] Appl. No.: 725,418

[22] Filed: Sept. 22, 1976

[51] Int. Cl.$^2$ ........................................... H01L 10/10
[52] U.S. Cl. ........................... 338/42; 73/141 A; 338/4
[58] Field of Search .............. 338/4, 5, 36, 42, 47; 73/398 AR, 141 A, 88.5 SD

[56] References Cited

U.S. PATENT DOCUMENTS

| | | | |
|---|---|---|---|
| 3,389,362 | 6/1968 | McLellan | 338/4 |
| 3,461,416 | 8/1969 | Kaufman | 338/4 |
| 3,970,982 | 7/1976 | Kurtz | 338/4 |

Primary Examiner—C. L. Albritton
Attorney, Agent, or Firm—Arthur L. Plevy

[57] ABSTRACT

A beam type transducer of the type activated by a push rod, which rod is secured to a thin silicon diaphragm including a shallow deflection area determining depression. The rod is secured to the silicon diaphragm within the depression and is surrounded by a glass plate. The glass plate has a central accommodating aperture for insertion of the rod therethrough and has a spherical depression ground on a surface and of a diameter relatively equal to the diameter of the depression in said silicon. The glass plate is bonded about its periphery to cover the silicon diaphragm with the spherical depression facing the depression in the silicon. The rod is bonded to the silicon and directed through the aperture in the glass. Immediately below the aperture in the glass and encircling the rod is a cylindrical member which acts as a negative over pressure stop. The other end of the rod is coupled to a beam for application of a force thereto. The structure described operates to limit the forces applied to the transducer in a positive direction and in a negative direction. The magnitude of desired forces are limited by causing the silicon diaphragm to impinge upon the spherical glass surface. For negative forces, the cylindrical member impinges against the bottom surface of the glass plate to thus limit these undesired forces.

15 Claims, 4 Drawing Figures

U.S. Patent        Sept. 27, 1977        4,051,451
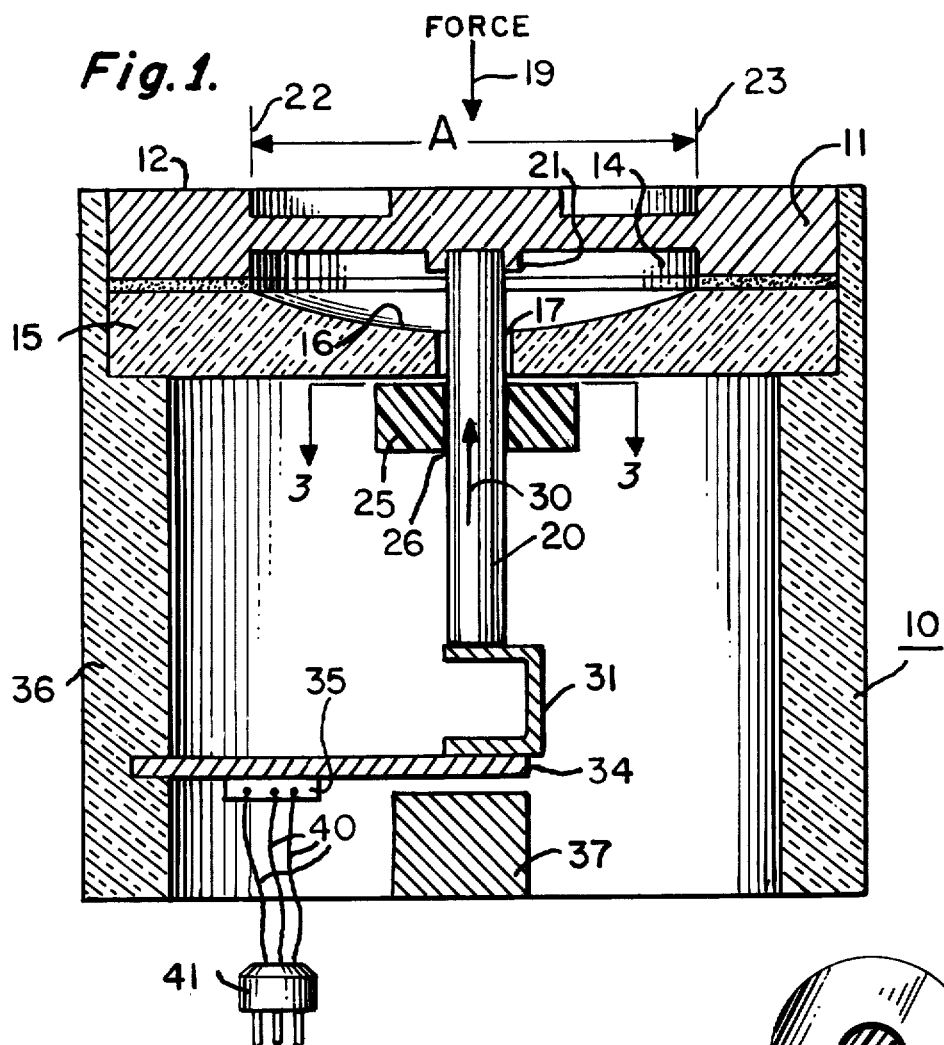
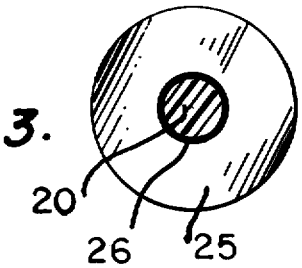
Fig.3.
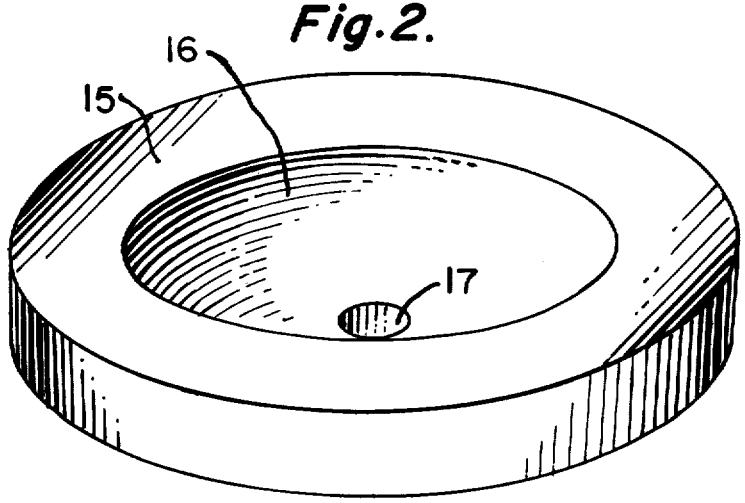
Fig.2.
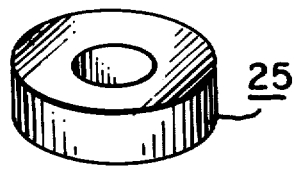
Fig.4.

BEAM TYPE TRANSDUCERS EMPLOYING DUAL DIRECTION FORCE LIMITING MEANS

BACKGROUND OF INVENTION

This invention relates to force limiting means for use with electromechanical transducers and more particularly to a force limiting means capable of stopping a transducer to prevent breakage of the same relatively independent of the direction of the applied force.

This invention involves improvement in force limiting mechanisms for relatively small transducers of the cantilever beam configuration.

U.S. Pat. No. 3,970,982 entitled BEAM TYPE TRANSDUCERS EMPLOYING ACCURATE INTEGRAL FORCE LIMITING issued on July 20, 1976 patented and assigned to the Assignee herein, shows cantilever transducers. In that patent, a detailed description of the problems one experiences in controlling excessive forces applied to the relatively fragile units was presented. One solution depicted apparatus wherein a silicon member utilized as a diaphragm had a central shallow depression formed on a surface thereof. A glass cover member had a central aperture and is coupled to the silicon member to cover the depression. A push rod was inserted in the aperture of the glass and secured to the silicon diaphragm. Hence, when an excessive force was imparted to the silicon diaphragm, the silicon coacted with the glass to stop the diaphragm for all forces which exceeded a predetermined level. The impingement of the thin silicon diaphragm with the glass cover member stops the silicon diaphragm without fracturing or rupturing of the same.

Since the shallow depression in the silicon could be accurately and reliably controlled, one was further assured that the elastic limits of the transducer would not be exceeded.

The stop or limiting apparatus described in the above noted application operates to prevent forces applied in the positive direction (i.e. relatively transverse to the diaphragm) from fracturing or rupturing the diaphragm or from exceeding the elastic limits of the cantilever transducer coupled to the diaphragm by means of the push rod.

However, it is also important to stop and prevent rupture or fracture of the assembly for forces applied in an opposite direction to the desired direction. These forces may develop, for example, when the apparatus is mishandled, dropped, or exposed to a high negative pressure.

It is therefore an object of the present invention to provide improved dual direction stopping mechanisms for a push rod cantilever transducer.

BRIEF DESCRIPTION OF PREFERRED EMBODIMENT

A beam type transducer of the type employing a deflectable beam having positioned on a surface thereof at least one force responsive element. In combination therewith are means for transmitting a force to said beam including means for accurately stopping said beam and diaphragm for all forces in both a positive and negative direction in excess of a predetermined force, comprising a semiconductor member having a central shallow depression on a surface thereof, said depression being of a predetermined depth, a glass cover member having a spherical depression relatively congruent with said depression in said semiconductor and having a central aperture of a given dimension; said glass cover member coupled to said semiconductor member to cover the depression in said semiconductor with said spherical depression facing the depression in said semiconductor, a rod having one end coupled to said semiconductor member within said depression and extending through said aperture in said glass with said other end coupled to said beam for deflecting the same upon application of a force to said semiconductor member, and a stopping member coupled to said rod and located beneath said aperture in said glass cover member; whereby all forces in a positive direction impinge upon said semi-conductor member in excess of said predetermined force causing said semiconductor member to impinge upon said spherical surface of said glass to thus stop said member and therefore said rod and all forces in a direction opposite to said positive direction in excess of said predetermined forces are stopped by said means coupled to said rod impinging upon said glass cover member.

BRIEF DESCRIPTION OF FIGURES

FIG. 1 is a cross-sectional view of a transducer including stopping means according to this invention.

FIG. 2 is a perspective view of a glass stopping plate with a spherical depression.

FIG. 3 is a cross-sectional view taken through line 3—3 of FIG. 1 depicting a push rod encircled by a negative pressure stop.

FIG. 4 is a plan view of a pressure stop.

DETAILED DESCRIPTION OF FIGURES

Referring to FIG. 1, there is shown a cross-sectional view of a cantilever or push rod activated transducer 10. The transducer 10 has a top diaphragm member 11, generally circular in shape and fabricated from silicon. The member 11 may have a peripheral flange 12 to offer additional support; which flange may be integrally formed as shown, or may be an additional silicon or glass member bonded about the periphery of the diaphragm 11.

The diaphragm 11 is a relatively thin piece of silicon and has etched on a bottom surface thereof, a shallow depression 14. The depression 14 is formed by a chemical etching process and the depth of the depression 14 is accurately controlled and may be extremely small as on the order of fractions to several mils deep.

A relatively thick piece of glass 15 (thicker than the diaphragm 11) is then bonded to the underside of the diaphragm 11 by a diffusion, epoxy bond or other bond. The glass piece 15 thus covers the depression 14 of the silicon member 11. As shown, the surface of the glass sheet 15 facing the diaphragm 11 is ground or polished to provide a spherical depression 16 (FIG. 2).

The depression 16 is relatively congruent with the etched depression 14 in the silicon member 11. The etched depression 14 thus accurately defines the active area A of the diaphragm. The active area A is the area which will deflect upon application of a force as 19 to the diaphragm 11.

The depth of the spherical depression 16 can also be accurately controlled and in conjunction with the depth of the depression 14 determines the maximum distance that the diaphragm can travel for application of forces applied thereto in the direction of arrow 19 herein referred to as the "positive" direction. The spherical depression 16 as ground or otherwise formed in the glass plate 15 assures that the diaphragm 11 will not rupture or crack for excessive forces applied thereto.

As previously described in the above noted copending application, the stopping action of a silicon diaphragm is provided when the diaphragm is caused to impinge upon a glass plate.

This impingement assures that the silicon will not crack due to overpressure or other excessive forces. However, by additionally providing a spherical depression 16 in the glass, this further assures that the diaphragm 11 will not rupture or crack for excessive forces applied near the periphery of the diaphragm active area.

Thus, as indicated in FIG. 1, the active area A of the diaphragm assembly is that area which deflects upon application of a force F to the diaphragm. Since the depression 16 on the glass sheet 15 is spherical, the distance between the glass and the diaphragm in the active area increases towards the center and hence, is less at the periphery. If a force were applied near the periphery of the active area as near lines 22 or 23, the silicon would impinge upon the glass more rapidly and thus be stopped quicker. The peripheral distance between the silicon and the glass due to the spherical aperture 16 is less than it is at the center. Thus, the spherical aperture 16 prevents cracking or fracturing of the diaphragm 11 for concentrated or pinpoint type forces applied near the periphery, as encountered in use.

The glass sheet 15 has a central aperture 17 located therein. The aperture 17 communicates with the depression 14 of the silicon diaphragm 11. A push rod 20 is directed through this aperture and bonded centrally to the silicon diaphragm 11. The glass plate may be first bonded to the diaphragm and then the rod inserted within the central aperture 17.

The rod 20 may be directly bonded to the diaphragm 11 or as shown in FIG. 1 or inserted within a boss 21. The boss 2 is centrally located and is prefabricated on the diaphragm to offer additional support for encircling and securing the top end of the bonded rod.

The push rod 20 is typically fabricated from an insulator material such as a ceramic, sapphire or glass. One may also secure the rod 20 to the diaphragm 11 by means of an epoxy, solder glass or other bond using a glass having a compatible thermal expansion coefficient with silicon.

Shown secured to the rod 20 beneath the bottom surface of the glass plate 15 is a washer or annular stopping member 25. (FIG. 3). The member 25 may be preferably fabricated from glass or another suitable material. The member 25 has a central aperture and encircles the rod 20 and is then bonded or glued to the rod 20 by means of a suitable bond 26; which may be an epoxy, solder glass and so on. The member 25 is positioned beneath the aperture 17 in the glass and is of a larger dimension than the aperture in the glass.

The transducers depicted are extremely small and are basically referred to as ultraminiature or miniature transducers. Typically, a washer as 25 may have an outer diameter of 62/1000 of an inch, an inner diameter of 25/1000 of an inch and may be 45/1000 of an inch in length. The distance between the bottom of the glass sheet 15 and the top of the member is extremely small and in fact, the member 25 may be in slight contact with the bottom of the glass sheet 15. For a differential transducer, the member 25 may be set at a predetermined distance depending on the magnitude of the forces involved. A convenient way of setting the member 25 is to affix it to the pushrod under application of the desired stopping pressure. The member 25 serves such that force applied in the direction of arrow 30 or opposite to desired forces in the direction of arrow 19, will cause the member 25 to coact with the glass sheet 15. The glass sheet being thicker than the silicon acts to thus stop the rod 20 from exerting any additional forces on the diaphragm 11, or beam 34.

Essentially, as can be seen from FIG. 1, if the member 25 were not present and one exerted a force in the direction of arrow 30, the silicon diaphragm would crack or break if the force were large enough. However, with the member 25 this cannot occur as the member 25 coacts with the glass member 15 so that all such forces are restrained by the glass. Thus, the member 25 in conjunction with the glass sheet 15, acts as a stop for a negative force or a negative overpressure as defined by forces in the direction of arrow 30.

The rod 20 may also be formed as to have an integral built-in stop as 25 or be fabricated with a preformed stop.

Undesireable, large negative forces can and do exist and can damage the transducer unless protected against and for instance, can be caused by a dropping of the unit or extreme vibration, negative overpressure, and so on.

In such a transducer as 10, the other end of the push rod 20 rests on a C shaped force transmitting member 31. The member 31 is fabricated from a relatively thin piece of a flexible metal and serves to couple or transmit forces between the push rod 20 and a cantilever beam 34. The other arm of the C shaped member 31 is secured to the beam 34 by means of an epoxy or other type bond.

The arm of the C shaped member 31 which contacts the rod 20 can be moved up and down to assure intimate contact. In this manner, the stop 25 will also function to protect the diaphragm 11 during such an adjustment.

The purpose of the C shaped member 31 is to assure that the length of the rod 20 need not be accurately determined due to the flexibility of the member 31. The C member also allows free bending of the cantilever in a smooth arc. The cantilever beam 34 may basically be a diffused beam. Hence, the beam 34 is fabricated from a relatively thin piece of silicon. In this manner, a suitable piezoresistive configuration 35 can be diffused directly into the silicon beam 34. While shown in FIG. 1 on the top surface this configuration can also be placed on the bottom surface.

As is known, the silicon beam 34 possesses an excellent modules of elasticity and a very high stiffness to density ratio. Therefore, the silicon is a good choice for use as a flexing structure and is shown used for both the diaphragm 11 and the beam 34.

One end of the beam 34 is secured to a housing 36 to thus form a cantilever structure. The housing 36 may be fabricated from glass, ceramic, or metal and may be of a cylindrical or other configuration. insulators are preferred as housing materials to preserve the inherent high voltage isolation of the transducer.

Also shown schematically and located beneath the cantilever 34 is a gross stopping member 37. The function of the member 37 is to prevent the beam 34 from being pushed beyond the elastic limits of the silicon during fabrication and assembly of the transducer.

The gross stop 37 is positioned and dimensioned to allow the cantilever to travel somewhat in excess of the allowed diaphragm travel. Thus, during the normal operation of the transducer, the diaphragm is stopped by the silicon and glass plate and is not stopped for normal operation by the gross stop 37.

The silicon beam 34 has located thereon, a diffused bridge pattern 35 which has leads as 40 emanating therefrom and is coupled to a connector or measuring device 41.

It is again noted that the transducer assembly depicted is extremely small. For example, the active area of such diaphragms may be two hundred mils or less. The aperture in the glass member may be of the order or magnitude of forty mils and the thickness of the silicon diaphragm between two and three mils. The length of the silicon beam would be about one hundred mils with the bridge pattern about ten mils. Such units may utilize rods as 20 which are approximately twenty mils in diameter.

FIG. 4 again depicts a stopping mechanism as 25 which may have an outer diameter of sixty mils, an inner diameter of twenty-five mils and be approximately forty-five mils long.

In summation, there is disclosed an improved beam transducer having a dual stop. The transducer is stopped for forces in a positive direction by causing the silicon diaphragm to impinge upon the spherical surface of a glass plate. For directions of forces opposite to the desired direction, the transducer is stopped by means of an annular member encircling the push rod, which member is forced against the periphery of the glass sheet about said rod accommodating aperture in the glass, to thereby limit the magnitude of such undesired forces.

We claim:

1. In a beam type transducer of the type employing a deflectable beam having at least one force responsive element positioned on a surface thereof, a rod having one end coupled to said beam and said other end coupled to a semiconductor diaphragm member, said diaphragm having a central depression with a glass sheet covering said depression and having a central aperture through which said rod as coupled to said diaphragm is directed, said rod capable of transmitting a force applied to said diaphragm to said beam in a positive direction, the improvement therewith of apparatus for stopping said rod for forces applied in a direction opposite to said positive forces, comprising means coupled to said rod and located beneath said aperture to coact with said glass sheet and hence, limit the motion of said rod for said opposite direction forces.

2. The transducer according to claim 1 wherein said glass sheet has a spherical depression on a surface facing said depression on said surface of said semiconductor member to limit forces in said desired direction exceeding a predetermined value by causing said semiconductor diaphragm to impinge upon said spherical depressed surface of said glass sheet.

3. The transducer according to claim 1 wherein said means coupled to said rod comprises an annular member encircling said rod beneath said aperture and means bonding said member to said rod.

4. The transducer according to claim 3 wherein said annular member comprises a cylindrical member having a central aperture slightly larger than the diameter of said rod for encircling the same with an outer diameter greater than the diameter of said aperture in said glass sheet.

5. The transducer according to claim 3 wherein said annular member is fabricated from an insulator material.

6. In combination:

a. a housing having a central hollow disposed relatively symmetrically about a longitudinal axis,
b. a cantilever beam having a first end affixed to said housing and a second deflectable end positioned relatively transverse to said axis,
c. a rod having a first end coupled to said deflectable end of said beam and a second end, said rod directed relatively parallel to said axis,
d. a silicon diaphragm member having a shallow depression with said second end of said rod coupled to said member within said depression,
e. a glass plate having a spherical depression of a diameter relatively equal to the diameter of said shallow depression, said glass plate coupled to said silicon diaphragm with said depressions facing each other, and a central aperture in said plate for accommodating said rod as coupled to said silicon diaphragm, and
f. a stop member coupled to said rod and positioned beneath said central aperture, whereby desired directional forces exceeding a perdetermined value as applied to said diaphragm to deflect said beam, are limited by said silicon member impinging upon said spherical glass surface and forces in a direction opposite to said desired direction are constrained by said stop member impinging upon said glass sheet.

7. The combination according to claim 6 wherein said stop member comprises an annular member of an outer diameter exceeding the diameter of said central aperture and an inner diameter slightly larger than the diameter of said rod for encircling said rod below said glass plate.

8. In a transducer of the type employing a semiconductor diaphragm member having a relatively central depression defining an active area, with a glass sheet covering said depression to act as a stop for said diaphragm for large desired direction forces applied to said diaphragm causing said semiconductor member to impinge upon said glass sheet, the improvement in combination therewith comprising a spherical depression located on the surface of said glass sheet facing said central depression and relatively of the same diameter to define said active region, said spherical depression being furthest from said semiconductor at a central region thereof and closest at a peripheral region whereby large forces applied to the peripheral region of said active area cause said semiconductor diaphragm to impinge upon said glass more rapidly than forces centrally applied.

9. The transducer according to claim 8 wherein said glass sheet further includes a central rod accommodating aperture.

10. The transducer according to claim 9 further including a rod coupled to said semiconductor diaphragm within said central depression and directed through and extending beyond said aperture in said glass sheet.

11. The transducer according to claim 10 further including an annular member encircling said rod beneath said aperture and operative to coact said glass sheet for forces applied in a direction opposite to said desired direction.

12. In a transducer of the type employing a diaphragm member capable of deflection upon application of a force applied thereto, the improvement in combination therewith comprising a glass sheet covering said diaphragm, said glass sheet having a spherical depression located on a surface thereof and of a diameter to determine an active deflection area for said diaphragm, said spherical depression serving to limit large forces applied to the peripheral region of said diaphragm, which forces cause said diaphragm to impinge upon said glass to limit the deflection of said diaphragm.

13. The transducer according to claim 12 wherein said diaphragm member is fabricated from a semiconductor material, such as silicon.

14. The transducer according to claim 13 further including a rod coupled to said diaphragm with said glass sheet having a central aperture through which said rod is directed, whereby said rod moves upon application of a given force to said diaphragm, and an annular stop member encircling said rod and located beneath said glass sheet to cause said member to impinge upon said glass sheet to limit the motion of said rod for forces applied in a direction opposite to said given force.

15. The transducer according to claim 14 wherein said annular stop member is fabricated from glass.

* * * * *